No. 613,802. Patented Nov. 8, 1898.
D. T. KENNEY.
WATER CLOSET.
(Application filed June 16, 1897.)
(No Model.) 4 Sheets—Sheet 1.
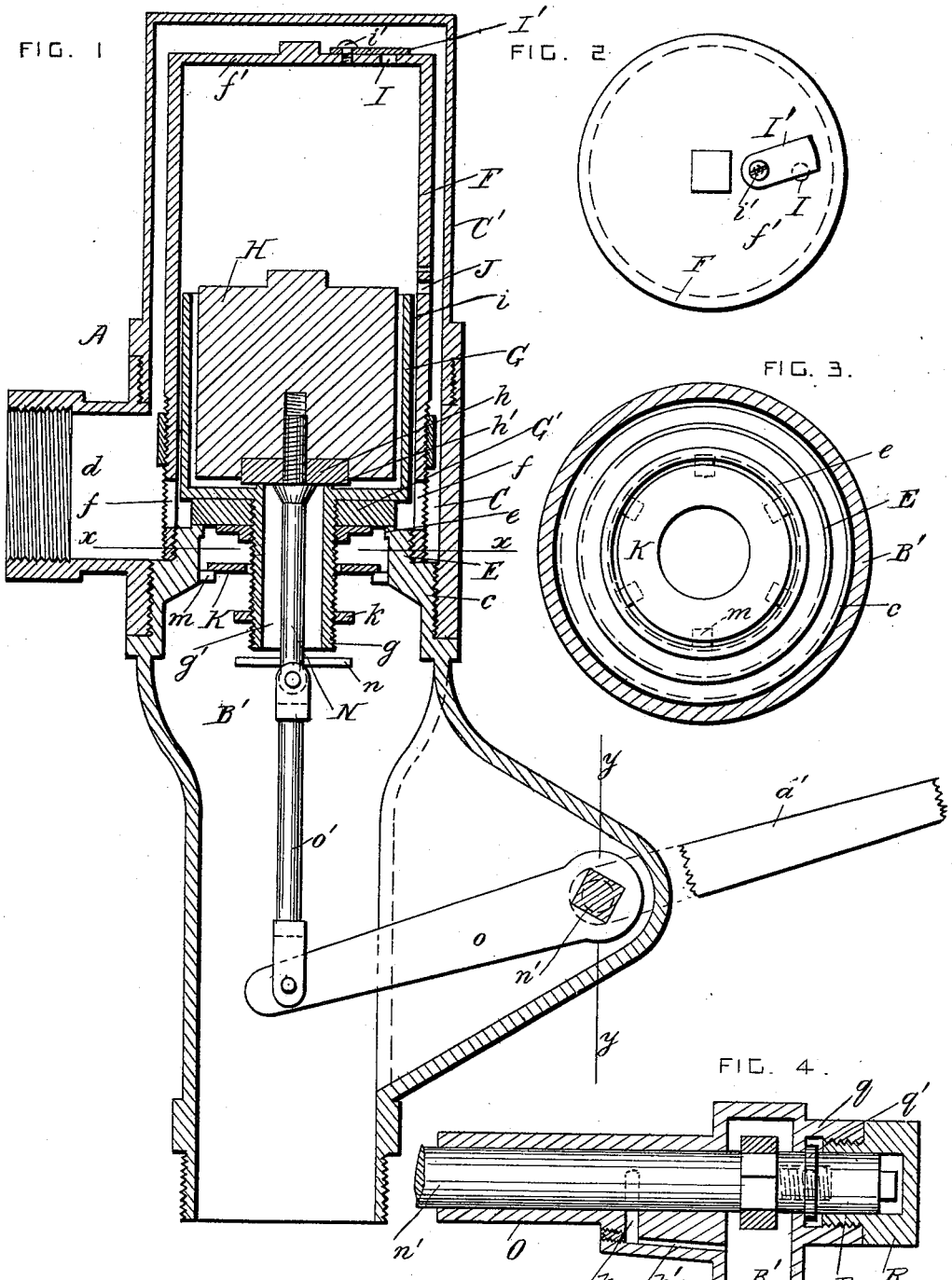
WITNESSES
INVENTOR
David T. Kenney
by Herbert W. T. Jenner.
Attorney No. 613,802. Patented Nov. 8, 1898.
D. T. KENNEY.
WATER CLOSET.
(Application filed June 16, 1897.)
(No Model.) 4 Sheets—Sheet 2.
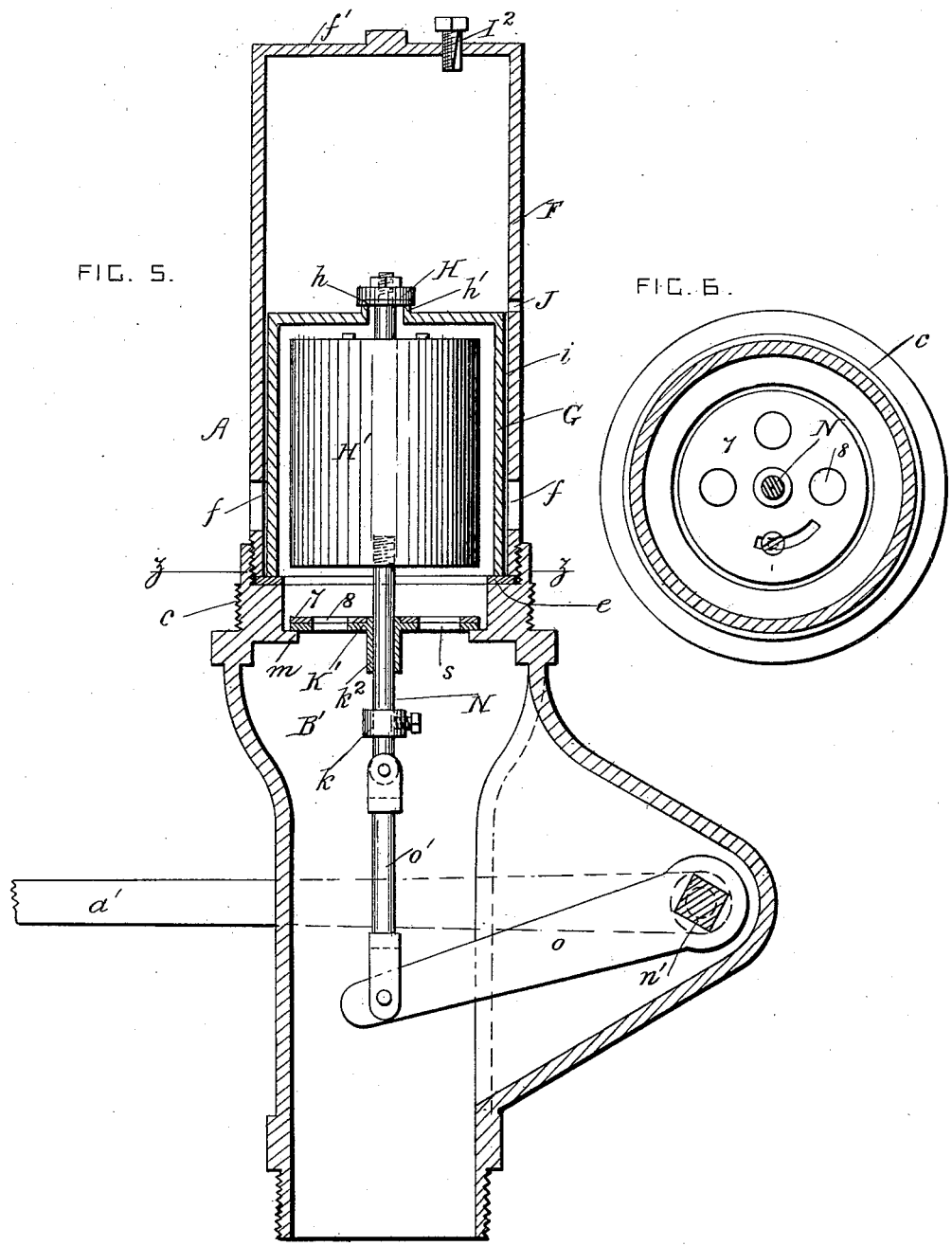

No. 613,802. Patented Nov. 8, 1898.
D. T. KENNEY.
WATER CLOSET.
(Application filed June 16, 1897.)
(No Model.) 4 Sheets—Sheet 3.

WITNESSES
J. Smgg Poole
J. G. Meyers

INVENTOR
David T Kenney
by Herbert W. T. Jenner.
Attorney

THE NORRIS PETERS CO., PHOTO-LITHO., WASHINGTON, D. C.

No. 613,802. Patented Nov. 8, 1898.
D. T. KENNEY.
WATER CLOSET.
(Application filed June 16, 1897.)
(No Model.) 4 Sheets—Sheet 4.
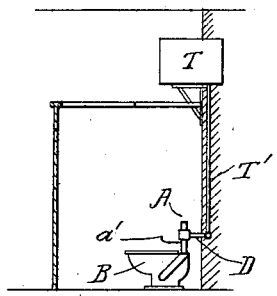
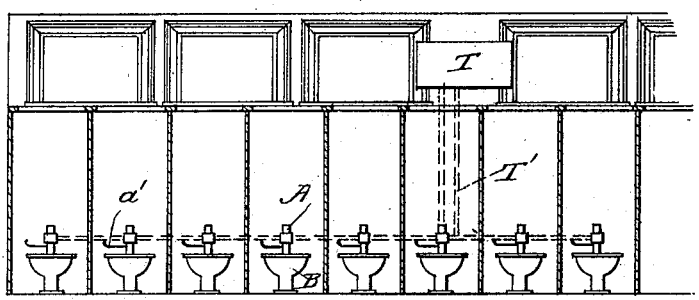
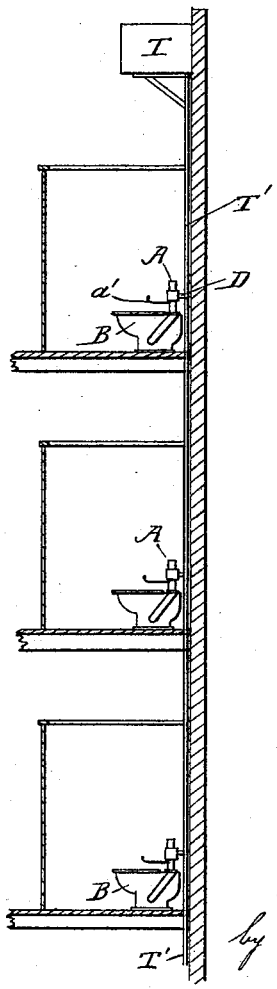
WITNESSES
INVENTOR
David T. Kenney
by Herbert W. T. Jenner.
Attorney June # UNITED STATES PATENT OFFICE.

DAVID THOMAS KENNEY, OF NORTH PLAINFIELD, NEW JERSEY.

WATER-CLOSET.

SPECIFICATION forming part of Letters Patent No. 613,802, dated November 8, 1898.

Application filed June 16, 1897. Serial No. 640,969. (No model.)

*To all whom it may concern:*

Be it known that I, DAVID THOMAS KENNEY, a citizen of the United States, residing at North Plainfield, in the county of Somerset and State of New Jersey, have invented certain new and useful Improvements in Water-Closets; and I do hereby declare the following to be a full, clear, and exact description of the invention, such as will enable others skilled in the art to which it appertains to make and use the same.

This invention relates to water-closets; and it consists in the novel construction and combination of the parts hereinafter fully described and claimed.

Figure 7:
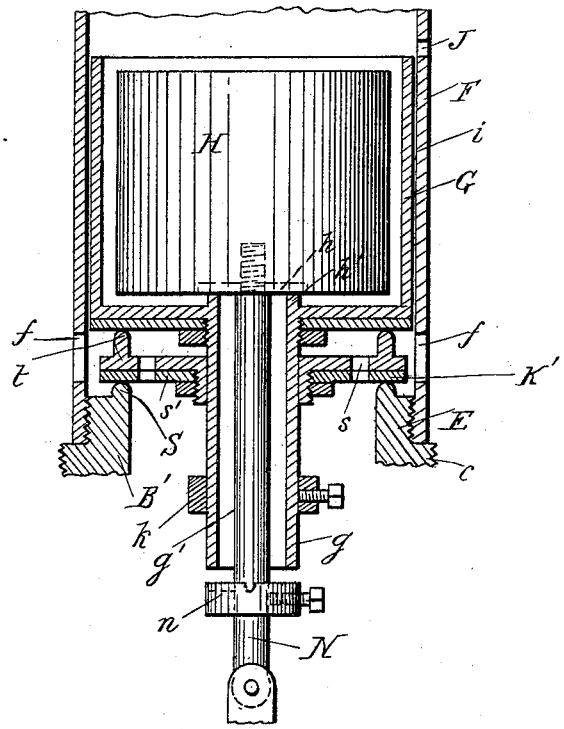
Figure 8:
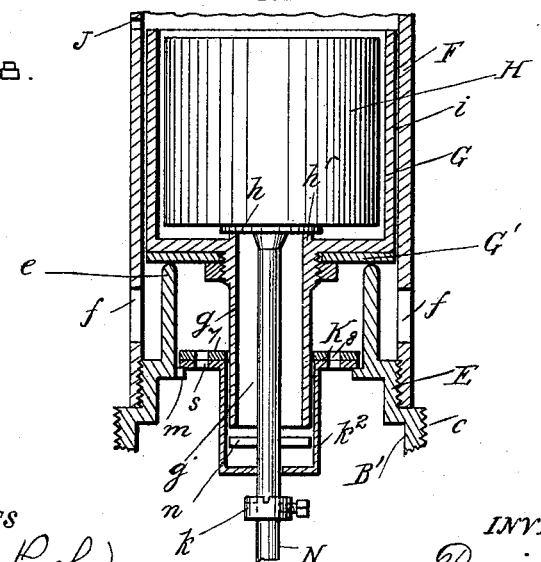

In the drawings, Figure 1 is a vertical section through the flushing-valve of the closet. Fig. 2 is a plan view of the top of the casing. Fig. 3 is a sectional plan view taken on the line $x$ $x$ in Fig. 1. Fig. 4 is a section taken on the line $y$ $y$ in Fig 1. Fig. 5 is a vertical section showing a modification of the flushing-valve. Fig. 6 is a sectional plan view taken on the line $z$ $z$ in Fig. 5. Fig. 7 is a vertical section showing a second modification of the flushing-valve. Fig. 8 is a vertical section showing a modification of the main-valve seat. Fig. 9 is a front view, partly in section, showing a system of supplying a series of closets with water when on the same floor; and Fig. 10 is an end view of the same. Fig. 11 is a side view, partly in section, showing a system of supplying a series of closets with water when on different floors.

A is a flushing-valve which is preferably arranged in close proximity to the bowl B of the closet to which it pertains, and $a'$ is an operating-lever for actuating the valve.

B' is the outlet-chamber of the flushing-valve, which is connected to the bowl in any approved manner.

C is the inlet-chamber of the flushing-valve, which is screwed onto the nozzle $c$ on the upper part of the outlet-chamber B'.

C' is a cap which is screwed into the inlet-chamber C and which forms the top part of it. A water-inlet pipe is screwed into a branch $d$, which projects laterally from the side of the inlet-chamber.

E is a nozzle projecting from the upper part of the outlet-chamber B' above the nozzle $c$, and $e$ is the main-valve seat at the top of the outlet-chamber.

F is a cylindrical casing screwed onto the nozzle E and arranged inside the inlet-chamber C. The casing F is provided with a water-inlet passage $f$, consisting of one or more holes, and has a top $f'$, which closes its upper end.

G is the main valve, which is preferably cylindrical and hollow. The valve G is provided with a tubular stem $g$, which affords a water-passage $g'$.

G' is a facing of leather or other soft material, which is secured to the valve G and which rests on the main-valve seat $e$.

H is a weighted relief-valve which is provided with a facing-plate $h$, of leather or other soft material. This facing-plate rests on a valve-seat $h'$, formed on the main valve G, and the relief-valve normally closes the water-passage $g'$ through the main valve.

If desired, the leather facings can be secured to the valve-seats instead of to the valves, or they may be omitted altogether and the valves ground to their seats.

The valve G slides in the casing F, and a very narrow annular passage $i$ is provided between the valve G and its casing, so that the said parts are not in contact and so that only a very small quantity of water can pass between them. The relief-valve H slides freely in the main valve G, an ample water-space being provided between them.

I is a small inlet-opening in the upper part of the casing F. The passage of water through the opening I is regulated by any approved means.

I' is a plate which is pivoted to the top of the casing by a screw $i'$. When the screw $i'$ is slack, the plate I' can be turned so as to adjust the area of the water-passage through the opening I or to close it altogether.

J is an inlet-port in the side of the casing F, close above the top edge of the main valve when closed. More than one inlet-port J can be provided, if desired, and the ports can be of any size or of different size and arranged one above the other or side by side, as found convenient in operating the valve under different pressures of water. In some cases it may be desirable to place a small port or ports above the port J, as shown in Fig. 1.

K is a controller, preferably consisting of a plate which slides freely on the tubular stem $g$ of the main valve. A collar or projection $k$ is provided for raising the plate K, and $m$ is a support consisting of a projection or projections on the outlet-chamber for supporting the plate K when in its lowest position. The collar $k$ is preferably screwed on the stem $g$ or is otherwise secured to it, so as to be adjustable vertically, and thus to permit the times of lifting and lowering the plate K to be regulated. The plate K does not fit the outlet-chamber, but merely obstructs it and permits a limited quantity of water to pass through it.

N is the stem of the relief-valve, provided with a projection $n$ for striking the tubular stem $g$ and raising the main valve.

The operating-lever $a'$ projects from a spindle $n'$, which is journaled in a bearing O on the outlet-chamber. An arm $o$ is secured on the spindle $n'$ inside the outlet-chamber, and $o'$ is a connecting-rod pivoted to the free end of the arm $o$ and to the lower end of the stem N.

Any approved means may be used for keeping the spindle $n'$ water-tight. When the bearing is very long, the spindle will be substantially water-tight in it. A small cavity $p$ is formed inside the bearing to catch any water which may be forced into it, and $p'$ is an inclined drain-hole leading from the cavity back into the outlet-chamber or to any other convenient point. When the drain-hole leads back into the outlet-chamber, water is not forced upward into it because of the air in the drain-hole and cavity.

P is a thimble which is screwed onto the end portion of the spindle $n'$ and which is journaled in a boss $q$ on the outlet-chamber. The thimble P is provided with a collar $q'$, which runs in a recess in the boss $q$. R is a cap screwed into the said boss and which prevents the spindle from moving too far endwise. The cap also prevents water from leaking out from the outlet-chamber.

The water stands under pressure in the inlet-chamber C and in the casing F. When the relief-valve is raised, the pressure in the casing F above the main valve is relieved and the main valve is easily raised by the projection on the relief-valve stem. The plate K is raised by the collar on the tubular stem of the main valve, and all the said parts are pushed into the upper part of the casing F by moving the lever $a'$ by hand. The hand-lever is then let go and the valves commence to descend. The weighted relief-valve descends first by gravity onto its seat, because the descent of the main valve is retarded by several causes, one of which is the friction between it and the fine annular stream of water which is passing upward through the narrow annular opening or passage $i$ between the main valve and its casing. The port J is closed by the main valve, and the water that enters the upper part of the casing must enter it by the passages $i$ and I. The main valve descends by gravity, and the time of its descent is regulated by the areas of the passages $i$ and I. The area of the passage $i$ is constant and is very small, and the area of the passage I is regulated and adjusted by the means provided for that purpose. When a very slow closing-valve is desired, the passage I is closed altogether. The bowl of the closet is flushed by the water which passes through the main-valve seat. Before the main valve reaches its seat the controller or plate K descends into the outlet-chamber and obstructs the free flow of water through the main-valve seat, but does not cut it off altogether. The siphoning action at the bowl ceases when the supply of water is thus controlled and reduced, and the plate K then descends onto the stationary support $m$.

In the Letters Patent No. 566,771, issued to me on September 1, 1896, a valve is shown which is provided with cylinders for obstructing the free flow of water shortly before the main valve closes; but these cylinders were attached to the valve and no stationary support was provided for them to rest on before the valve closed. When thus constructed, the downflow of water below the main valve and in the annular passage around the cylinders operated to draw down the valve with considerable force until it touched its seat. When the main valve is provided with a controller which is not attached to it and a stationary support for the controller, as hereinbefore described, the downflow of water has practically no influence upon the main valve, as its power is expended in pressing or drawing down the controller upon the stationary support, and the valve therefore closes silently and very gently. The controller operates to increase the time during which the small quantity of water may flow after the large flow has been stopped, and after the controller touches its stationary support the water between it and the valve acts as a buffer which retards the closing of the valve to a slight extent. It will be seen that as long as the controller is within the outlet-chamber, whether during the opening or closing of the main valve, the outflowing water will be trapped thereby below and on the discharge side of the main valve and will thereby be caused to equalize the pressure, thus assisting the opening and particularly retarding the closing of the main valve, and that as the rush of onflowing water is broken by the controller the pull on the main valve which would be exerted by a solid and rapidly-moving current of water flowing through the outlet-chamber to rapidly close the valve is obviated, permitting the valve to be opened easily and to close slowly and steadily. The main valve finally comes down onto its seat and cuts off the water altogether. The water which passes through the main-valve seat after the plate K enters it operates as a gentle refill or afterrush which fills the bowl to the desired height after the siphoning action has ceased.

The inlet-port J is provided in order to prevent the main valve from fluttering just before it descends onto its seat. The conditions when the main valve is near its seat are different from what they are when the valve is at a greater distance from it, and it is found that the fluttering of the main valve is stopped by permitting it to uncover the port J and admit a free supply of water to the casing F just before the main valve comes onto its seat.

In the modification of the flushing-valve shown in Fig. 5 the main valve is inverted and the weight H', which operates the relief-valve H, is made separate from the said relief-valve and is placed on the relief-valve stem below the main valve, where it also serves as a projection for raising the main valve. The weight H' may be applied in any other equivalent manner, so as to cause the descent of the relief and main valves. The weight may be connected by a lever to the spindle $n'$ outside the outlet-chamber, and the lever $a'$ may be placed as shown in Fig. 5, so that it serves as a weight for depressing the valves. The casing F is screwed into a nozzle on the outlet-chamber instead of onto a nozzle, as shown in Fig. 1. When screwed into the nozzle, as shown in Fig. 5, the casing secures in position a facing-plate of soft material for the main valve to descend onto. A notched screw $I^2$ is shown for regulating the passage of water into the casing as the equivalent of the plate I'.

Instead of letting the plate K descend onto projections $m$, as shown in Fig. 1, the plate may be provided with perforations, and it may then descend onto an imperforate flange or seat. This construction is illustrated in Figs. 5 and 7, in which the plate K' is provided with holes $s$, and in Fig. 7 a facing-plate $s'$, of leather, is shown, which rests on the seat S. A seat $t$ for the main valve is here formed on the upper side of the plate K'. The operation of the parts is the same as hereinbefore described. The rush of water for flushing the bowl is cut off when the plate descends onto its stationary support, and the afterrush is subsequently cut off by the main valve.

In Fig. 5 the projection $k$ for raising the plate K' is placed on the relief-valve stem instead of on the stem of the main valve, and the plate K' is provided with an extension $k^2$ for the said projection to strike against. A plate 7 is also provided above the plate K' as a means for regulating the passage of water through its holes. The plate 7 is provided with holes 8 and may be turned around so that the holes in the two plates are in line with each other or are covered more or less, according to the amount of afterrush or refill required.

In the construction shown in Fig. 5 it will be seen that when the valve H is first raised the water contained in the chamber above the top of the main valve will flow therefrom downward into the chamber formed by the hollow interior of the main valve on the discharge side thereof, the flow from the said chamber being checked by the controller, which is still upon its support, thus equalizing the pressure upon the two sides of the main valve and permitting the valve to be opened easily. When in the closing of the valve the relief-valve has closed and the controller has descended upon its support, the water passing through the lateral passages $f$ will be checked by the controller, filling the chamber formed on the discharge side of the main valve, a portion of the contents of which must escape before the main valve can seat, and thus the valve H in such a construction is a relief, equalizing, and retarding valve, and I use the term "auxiliary valve" to designate a valve having any of the above-named functions.

In Fig. 8 a modification of the main-valve seat $e$ is shown in which the seat $e$ is carried up to a point above the level of the top of the inlet-passage $f$ in the casing F. This construction is specially adapted for high pressures of water, as it prevents the water from bearing against the lower portion of the periphery of the main valve, which, as shown in Fig. 1, comes opposite the inlet-holes. When the valve is constructed as shown in Fig. 1 and used for high-pressure water, it makes a noise when it opens, because the water can strike against and across the bottom edge of the valve G and set up sound-vibrations when it rushes through the openings $f$; but when constructed as shown in Fig. 8 it opens silently and with greater freedom. In the construction shown in this figure a central depression is formed in the controller, forming a cup $k^2$, in which the lower end of the tubular stem of the main valve is normally contained. The stem N passes through and moves within an aperture in the center of the bottom of the cup and carries an adjustable collar $k$, normally slightly below the bottom of the cup, and also carries a projection normally slightly below the lower end of the tubular stem of the main valve, which it is adapted to lift. In a valve of this character the initial movement of the stem N will raise the relief-valve H, as before described in connection with other forms of my invention; but instead of the discharge from the said valve flowing freely through the outlet-chamber to the bowl a part of such discharge will be trapped by the controller, thereby equalizing the pressure on the two sides of the main valve and making it easy to lift the valve H and (through its stem N and projection $n$) the main valve, thus assisting the opening of the latter. In this form of my invention, therefore, the valve H not only serves to relieve the pressure in the chamber above the main valve, but also to create an equalizing pressure on the opposite or discharge side of the main valve, and it therefore may be called an "auxiliary valve," an "equalizing-valve," or a "combined relief and equalizing valve." In closing, the valve H closes the upper end of the tubular stem and the controller moves down into the outlet-chamber and rests upon its support. The water contained in the water-chamber formed by the tubular stem $g$ and the cup then retards the further descent of the main valve until the water has escaped from the interior of the cup. It will also be seen in this form of my invention that as the lower end of the stem of the main valve is normally contained within the cup of the controller and is also contained therein during the periods of initial movement from and the final movement back to that position the cup will during such movements of the main valve shield the stem thereof from the influence of the water flowing through the outlet; but for this, as before stated in respect to the construction shown in Fig. 1, the water flowing through the outlet would not only cause the valve to be opened with difficulty, but would tend to drag the main valve to its seat and would under certain conditions render the action of the retarding mechanism uncertain.

In order to supply a series of closets from a single cistern T, the cistern is arranged above the highest closet of the series and a main pipe T' is provided. The water-inlet pipes D are all connected to the main pipe T'. When the closets are all on the same floor, the main pipe T' is arranged with a horizontal extension in any position which will permit the pipes D to be coupled to it as directly as possible, and the extension is preferably arranged in the wall behind the closets. The flushing-valves are all arranged close adjacent to the closets to which they pertain, and their peculiar construction, as hereinbefore fully described, enables them to cut off noiselessly the solid body of water which extends from the cistern through the main pipe. When valves of this construction are used, it is practicable for a series of closets to be supplied from a single cistern or tank, and a separate cistern for each closet is not required. The noiseless closing of the main valve is due to the fact that the controller or plate K or K' rests on a stationary support before the main valve closes, so that the downward pressure or suction of water on the plate or controller is not communicated to the main valve when it is about to come in contact with its seat.

In this application I do not claim the combination of an inlet-chamber provided with an outlet, a main valve closing the outlet when seated, an auxiliary chamber, and an auxiliary valve for connecting the inlet and auxiliary chambers, or claims specific thereto, as such subject-matter is claimed in another application, filed by me on the 14th day of May, 1898, and serially numbered 680,723.

What I claim is—

1. The combination, with a chamber provided with an outlet, and a movable valve for closing said outlet; of a controller, means independent of the movable valve for supporting the controller on the discharge side of the said main valve, and means for retarding the closing of the valve, substantially as set forth.

2. The combination, with a main valve, and a retarding-chamber regulating the movement of the said valve; of a plate provided with a water-passage, means for varying the area of the said water-passage, a stationary support for the said plate, and means operating to raise the said plate so as to let the water flow freely after the main valve is opened, and to lower it onto its support before the main valve is closed, substantially as set forth.

3. The combination, with a main valve, an actuating-stem, a collar adjustable vertically on the said stem, and a seat for the said valve; of a controller operating to obstruct the free passage of water through the valve-seat when lowered, and a stationary support for the said controller, said collar being arranged to raise and lower the said controller, substantially as set forth.

4. The combination, with a casing provided with a main-valve seat and a lateral water-inlet passage at its lower part, and having a small passage connecting its upper and lower parts; of a main valve slidable in the said casing and provided with a water-passage, a weighted relief-valve carried by the main valve and closing its said water-passage, a controller operating to obstruct the free passage of water through the main-valve seat when lowered, a stationary support for the said controller, and means for raising the relief-valve, the main valve, and the controller, one after another, and permitting the controller to descend onto its support before the main valve is closed, substantially as set forth.

5. The combination, with a casing provided with a main-valve seat and a lateral water-inlet passage at its lower part, and having a small passage connecting its upper and lower parts; of a main valve slidable in the said casing and provided with a tubular stem which forms a water-passage, a weighted relief-valve carried by the said main valve and provided with a stem projecting through the said tubular stem; a controller operating to obstruct the free flow of water through the main valve when lowered, a stationary support for the said controller, and projections actuated by the stem of the relief-valve and operating to raise the main valve in advance of the controller, and permitting the controller to descend in advance of the main valve, substantially as set forth.

6. The combination, with an outlet-chamber having a main-valve seat at its upper part and a support below the said valve-seat; of a casing secured to the outlet-chamber over the said valve-seat and provided with a lateral water-inlet passage at its lower part and a small passage connecting its upper and lower parts, a controller operating to obstruct the free flow of water through the valve-seat when resting on the said support, a main valve slidable in the said casing and provided with a water-passage a weighted relief-valve carried by the main valve and provided with a stem projecting through the said water-passage and having a projection which operates to raise the main valve in advance of the controller, a spindle journaled in the said outlet-chamber and provided with an operating device, and an arm secured on the said spindle inside the outlet-chamber and operatively connected to the said valve-stem, substantially as set forth.

7. The combination, with a casing provided with a main-valve seat and a lateral water-inlet passage at its lower part, a small inlet-opening I at its upper part, and a small passage connecting its upper and lower parts; of a main valve slidable in the said casing, and a weighted relief-valve bearing on the main valve and operating to close it, substantially as set forth.

8. The combination, with a casing provided with a main-valve seat and a lateral water-inlet passage in its lower part, a small inlet-opening I at its upper part, and a small passage connecting its upper and lower parts; of means for regulating the passage of water through the said opening I, a main valve slidable in the said casing, and a weighted relief-valve bearing on the main valve and operating to close it, substantially as set forth.

9. The combination, with a casing provided with a main-valve seat and a lateral water-inlet passage at its lower part, a port J in its side, and a small passage connecting its upper and lower parts; of a main valve slidable in the said casing and operating to uncover the said port just before the said valve descends onto its seat, and a weighted relief-valve bearing on the main valve and operating to close it, substantially as set forth.

10. The combination, with a main valve, and its seat; of a controller operating to obstruct the free passage of water through the valve-seat when lowered, a stationary support for the said controller, means for lowering the said controller in advance of the main valve, and a casing inclosing the main valve and provided with a lateral water-inlet passage at its lower part, a small passage connecting its upper and lower parts, and a port which is uncovered by the main valve just before it closes and which admits an additional supply of water above the main valve, substantially as set forth.

11. The combination, with an outlet-chamber provided with a projecting valve-seat at its upper part; of a casing secured to the said outlet-chamber and provided with a lateral water-inlet passage arranged wholly below the level of the top of the said valve-seat, and having a passage connecting its upper and lower parts; a main valve slidable in the said casing, and a weighted relief-valve bearing on the main valve and operating to close it, substantially as set forth.

12. The combination, with a chamber provided with an outlet, and a valve closing said outlet; of a controller operatively movable in respect to the valve and operating when in its normal position to obstruct the free passage of water through the outlet, and means for actuating the valve and controller and for thus permitting the water to flow freely through the outlet while the valve is fully open and to permit the controller to check the flow when the valve is partly open, the valve-seat being between the point of inflow and the normal position of the controller, substantially as set forth.

13. The combination, with a chamber provided with an outlet-passage, and a valve for closing said passage; of a support carried by the said chamber, a controller arranged between the said valve and support and operating to obstruct the free flow of water when in its normal position on said support, means for raising the said valve and controller and thereby permitting the water to flow freely, and a retarding-chamber for regulating the descent of the controller and valve, substantially as set forth.

14. The combination, with a chamber provided with an outlet, and a valve closing said outlet; of a controller operatively movable in respect to the valve and operating when in its normal position to obstruct the free passage of water through the outlet, and means for actuating the valve and controller, and for thus permitting the water to flow freely through the outlet, the valve-seat being located between the point of the inflow and the normal position of the controller, substantially as set forth.

15. The combination, with a water-receptacle provided with an outlet, of a main valve closing said outlet, an auxiliary valve for opening communication from the pressure side of the valve to its discharge side, and means for obstructing the flow of water discharged by the auxiliary valve, whereby an equalizing-pressure is created upon the discharge side of the main valve, substantially as set forth.

16. The combination, with a chamber provided with an outlet, and a valve closing the outlet; of a controller movable in relation to the main valve and operating when in its normal position to obstruct the free passage of water through the outlet and to form a water-chamber on the discharge side of the main valve, an auxiliary valve to permit the flow of water into the water-chamber to equalize the water-pressure on the opposite sides of the main valve, and means for raising the auxiliary valve and controller, substantially as set forth.

17. The combination, with a chamber provided with an outlet, and a valve closing said outlet; of a controller movable in relation to the main valve and operating when in its normal position to obstruct the free passage of water through the outlet, and forming a water-chamber on the discharge side of the main valve, and an auxiliary valve to permit the flow of water into the water-chamber before the main valve is opened, to equalize the pressure on the opposite sides of the main valve, the water-chamber having a restricted discharge area to retard the closing of the main valve when the auxiliary valve is closed, substantially as set forth.

18. The combination, with a chamber provided with an outlet-passage, and a valve for closing said passage; of a support carried by the said chamber, a controller arranged between the said valve and support and forming a retarding-chamber in the said passage when resting on the said support, which chamber retards the final closing of the said valve, means for operating the said valve and controller so that a free flow of water may be obtained, and a second retarding-chamber operatively connected with the said valve and controller and regulating their simultaneous movement toward the valve-seat and the said support, substantially as set forth.

19. The combination, with a chamber provided with an outlet, and a tubular casing; of a main valve closing the outlet when in its normal position and slidable in the said casing and forming therewith a retarding-chamber having an inlet-passage of restricted area, a relief-valve opening and closing a passage from the retarding-chamber, a controller operating to obstruct the free passage of water through the outlet when in its normal position, means for opening the relief-valve and then the main valve, and for moving the controller and for then closing the relief-valve to retard the closing of the main valve until the controller returns to normal position, and means for causing the controller after it has returned to normal position to retard the closing of the main valve, substantially as set forth.

20. The combination, with a water-chamber provided with an outlet, of a plate, a main valve for closing the said outlet and forming with the plate an equalizing-chamber on the delivery side of the said valve, an auxiliary valve for admitting water from the water-chamber to the equalizing-chamber, the said equalizing-chamber having a communication of contracted area with the discharge, substantially as set forth.

21. The combination, with a casing, of a main valve slidable in the casing and forming therewith a chamber, a relief-valve controlling the outflow of water from the chamber, the casing having a port in its side which is covered by the main valve when open and is uncovered by the main valve before the latter closes, substantially as set forth.

In testimony whereof I affix my signature in presence of two witnesses.

DAVID THOMAS KENNEY.

Witnesses:
THEODORE J. F. ZELLER,
ANTHONY MARTEL.